3,834,986
CONTROL ROD FOR NUCLEAR REACTORS
Antti Suvanto, Vasteras, Sweden, assignor to Aktiebolaget
Asea-Atom, Vasteras, Sweden
Filed Aug. 24, 1972, Ser. No. 283,487
Claims priority, application Sweden, Oct. 11, 1971,
12,820/71
Int. Cl. G21c 19/10
U.S. Cl. 176—33                1 Claim

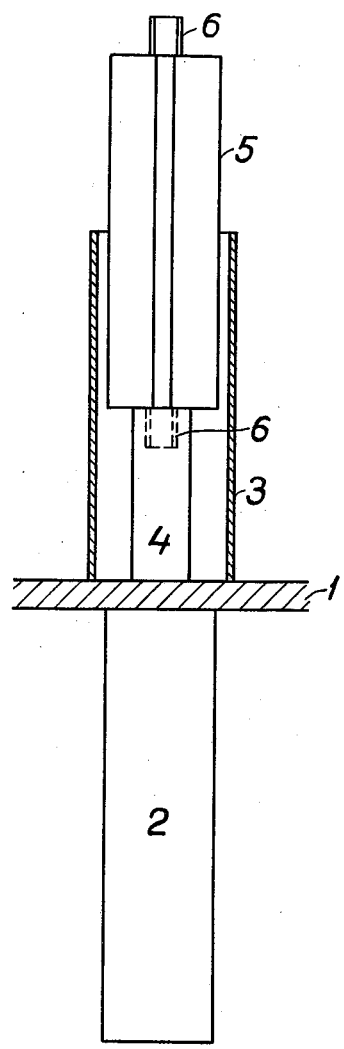

ABSTRACT OF THE DISCLOSURE

In order to provide more efficient use of control rods for nuclear reactors, they are provided with attachment means at both ends for attachment to a movable holder such as a movable shaft. Thus the rods may be reversed when one end is spent, while the other end still has useful life.

BACKGROUND OF THE INVENTION

1. Field of the Invention

The present invention relates to a control rod for a nuclear reactor, said control rod comprising a substantially cylindrical or prismatic rod having attachment means for attachment thereto of a movable holder or a movable shift.

2. The Prior Art

Nuclear power reactors often comprise a number of parallel radioactive fuel assemblies arranged, usually vertically, in a certain pattern and with certain spacing. In order to regulate the radioactive process, neutron-absorbing rods are inserted between the fuel assemblies.

The rods are attached by one end in a movable holder so that the rods can be inserted into corresponding spaces between the fuel assemblies and thus reduce the neutron radiation between them. By inserting the rods further or not so far in between the fuel assemblies, the activity of the reactor is altered. The rods may be inserted from below, which is usual in boiling water reactors, or from above, which is usual in pressurized water reactors.

In time the absorption ability of the rods is reduced due to the action of the neutrons and, when this ability has reached a certain level (often about 10%), the rods are considered to be spent and must be exchanged. Since, with varying loads, the part of the rod furthest from the holder has a much longer operating time than the part of the rod nearest the holder, the further part will be more quickly burnt out than the rest of the rod. For this reason the rod must be exchanged while a large portion of it is still perfectly usable. Only about one third of the rod is normally consumed.

SUMMARY OF THE INVENTION

The rod is used more economically in accordance with the present invention where the rod is provided with attachment means at both ends. Thus, when one end of the rod has been consumed, it can be reversed, thus substantially doubling the life of the rod. When estimating the time the rod can be used before it must be reversed, it must be taken into consideration that the rod becomes brittle because the radiation affects the strength of the rod. However, there is nothing to indicate that the reduction in strength takes place more rapidly than the reduction in absorption ability and reasonable efficiency can therefore be expected from both ends of the rod.

BRIEF DESCRIPTION OF THE DRAWINGS

The invention will be further described with reference to the accompanying drawing which shows purely schematically a control rod unit with a control rod according to the invention.

Description of the Preferred Embodiments

The control rod unit, which may be constructed in accordance with U.S. patent application No. 149,558 (KN3603) is attached to the reactor bottom 1 and comprises a drive means 2 outside the reactor bottom and a support tube 3 inside the reactor, this being an extension of the drive means. A shaft 4 projects from the drive means and a control rod 5 is attached to the end of this shaft. The control rod may be attached in the shaft 4 with the help of a screw pin 6 on the rod which fits into a threaded hole in the shaft. The control rod 5 is provided with screw pins 6 at both ends so that it can be turned and use made of both ends. Some form of bayonet holder or ball and spring lock is also possible instead of the screw connection or it may be the shaft which is provided with a screw pin while the control rod is provided with screw holes at both ends.

The control rod may have cruciform cross-section as indicated in the drawing, or it may have circular cross-section and the attachment means is suitably adapted to the type of control rod used. Most important is that the rod has the same shape at the two ends so that same attachment means can be used at both ends.

The invention can also be used in cases where several control rods are arranged parallel to each other in a common holder, for example as shown in U.S. patent application No. 112,218 (KN3616).

What is claimed is:
1. A nuclear reactor having a vertical support tube secured to the bottom of the reactor and extending upwardly into the core of the reactor, drive means for a control rod positioned below said tube including a movable holder movable from below into the support tube and into said core, a rigid one-piece control rod movable in said tube and said core and supported therein by said holder, the height of the control rod being substantially equal to the height of the tube, said control rod having the same attachment means at both ends and said holder having means at its upper end cooperating with said attachment means for holding the control rod rigidly in upright position with the attachment means of either end of the control rod attached to the holder, whereby the control rod may be reversed when one end part thereof is spent, while the other end still has useful life, this being accomplished by the control rod having the same attachment means at each end for coupling with and movement by the same drive means.

References Cited

UNITED STATES PATENTS

| | | | |
|---|---|---|---|
| 3,375,170 | 3/1968 | Stubley | 176—86 R |
| 3,713,971 | 1/1973 | Santen et al. | 176—35 X |

FOREIGN PATENTS

| | | | |
|---|---|---|---|
| 1,102,235 | 2/1964 | Great Britain | 176—86 R |
| 1,420,588 | 10/1964 | France | 176—35 |

OTHER REFERENCES

BAW-147, Dec. 22, 1960.

CARL D. QUARFORTH, Primary Examiner

R. S. GAITHER, Assistant Examiner

U.S. Cl. X.R.

176—36 R, 36 C, 86 R